US007814316B1

(12) United States Patent
Hughes et al.

(10) Patent No.: US 7,814,316 B1
(45) Date of Patent: Oct. 12, 2010

(54) SYSTEM, METHOD AND DATA STORAGE DEVICE FOR ENCRYPTING DATA

(75) Inventors: James P. Hughes, Herndon, VA (US); Alexander Stewart, Louisville, CO (US); Dwayne A. Edling, Longmont, CO (US); Gregory S. Toles, Erie, CO (US); Bradley E. Whitney, Erie, CO (US); Benjamin J. Baron, Broomfield, CO (US); Howard H. Rather, Boulder, CO (US); Michael E. Foy, Couisville, CO (US); Daniel Dauer, Fort Collins, CO (US)

(73) Assignee: Oracle America, Inc., Redwood City, CA (US)

( * ) Notice: Subject to any disclaimer, the term of this patent is extended or adjusted under 35 U.S.C. 154(b) by 1084 days.

(21) Appl. No.: 11/500,047

(22) Filed: Aug. 7, 2006

Related U.S. Application Data

(63) Continuation-in-part of application No. 11/404,692, filed on Apr. 14, 2006.

(51) Int. Cl.
*H04L 29/06* (2006.01)
(52) U.S. Cl. .................................................. 713/160
(58) Field of Classification Search ....................... None
See application file for complete search history.

(56) References Cited

U.S. PATENT DOCUMENTS 6,128,737 A * 10/2000 Jakubowski et al. ........ 713/181
7,007,166 B1   2/2006 Moskowitz et al.
2006/0242489 A1* 10/2006 Brockway et al. ........... 714/718
2007/0016942 A1*  1/2007 Sakai et al. ..................... 726/9
2007/0078817 A1*  4/2007 Girao et al. ..................... 707/2

OTHER PUBLICATIONS

Office Action for U.S. Appl. No. 11/404,692, dated Jun. 29, 2009.
Notice of Allowance for U.S. Appl. No. 11/404,692, mailed Nov. 18, 2009.
Notice of Allowance for U.S. Appl. No. 11/404,692, mailed Jan. 11, 2010.

* cited by examiner

*Primary Examiner*—Brandon S Hoffman
(74) *Attorney, Agent, or Firm*—Brooks Kushman P.C.

(57) ABSTRACT

A data encryption system with encryption integrity verification includes an encryption engine configured to receive an unencrypted data packet and generate an encrypted data packet based at least in part on the unencrypted data packet. The system also includes a decryption engine in electronic communication with the encryption engine, the decryption engine configured to receive the encrypted data packet and generate a decrypted data packet based at least in part on the encrypted data packet. The system further includes a comparator in electronic communication with the encryption engine and the decryption engine, the comparator configured to receive the unencrypted and decrypted data packets, determine whether the unencrypted and decrypted data packets are identical, and present the encrypted data packet as an output when the unencrypted and decrypted data packets are identical.

10 Claims, 6 Drawing Sheets

SYSTEM, METHOD AND DATA STORAGE DEVICE FOR ENCRYPTING DATA

CROSS-REFERENCE TO RELATED APPLICATIONS

This application is a continuation-in-part of U.S. application Ser. No. 11/404,692 filed Apr. 14, 2006, presently pending, which is hereby incorporated by reference in its entirety.

STATEMENT REGARDING FEDERALLY SPONSORED RESEARCH OR DEVELOPMENT

The invention was made with Government support under Contract No. #2004*P125120*000. The Government has certain rights to the invention.

BACKGROUND OF THE INVENTION

1. Field of the Invention

The present invention relates generally to a system, method and data storage device for encrypting data, and in particular to a system, method and data storage device for encrypting data to provide at-rest data encryption in a data storage device.

2. Background Art

Protecting data from unauthorized access is becoming increasingly important. Both the amount and kinds of data generated requiring protection continue to increase. Moreover, attacks by those not authorized to access the data grow in frequency and sophistication. An emerging need is for the encryption of data held in storage devices, often referred to as "at-rest data encryption."

SUMMARY OF THE INVENTION

The present invention generally implements data encryption as part of the overall storage system architecture. Accordingly, the present invention may provide at-rest data encryption having full cryptographic integrity and/or which cannot be undetectably bypassed.

According to the present invention, a data encryption system with encryption integrity verification is provided. The system comprises an encryption engine, a decryption engine, and a comparator. The encryption engine is configured to receive an unencrypted data packet and generate an encrypted data packet based at least in part on the unencrypted data packet. The decryption engine is in electronic communication with the encryption engine. The decryption engine is configured to receive the encrypted data packet and generate a decrypted data packet based at least in part on the encrypted data packet. The comparator is in electronic communication with the encryption engine and the decryption engine. The comparator is configured to receive the unencrypted and decrypted data packets, determine whether the unencrypted and decrypted data packets are identical, and present the encrypted data packet as an output when the unencrypted and decrypted data packets are identical.

Still further according to the present invention, a data storage system is provided. The data storage system comprises a key management device and a data storage device. The key management device has a set of encryption keys and a set of key identifiers. Each member of the set of key identifiers corresponds to a member of the set of encryption keys. The data storage device is in electronic communication with the key management device via an interface device. The data storage device is configured to store a subset of the set of encryption keys and a corresponding subset of the set of key identifiers in a volatile memory of the data storage device.

DETAILED DESCRIPTION

Figure 1:
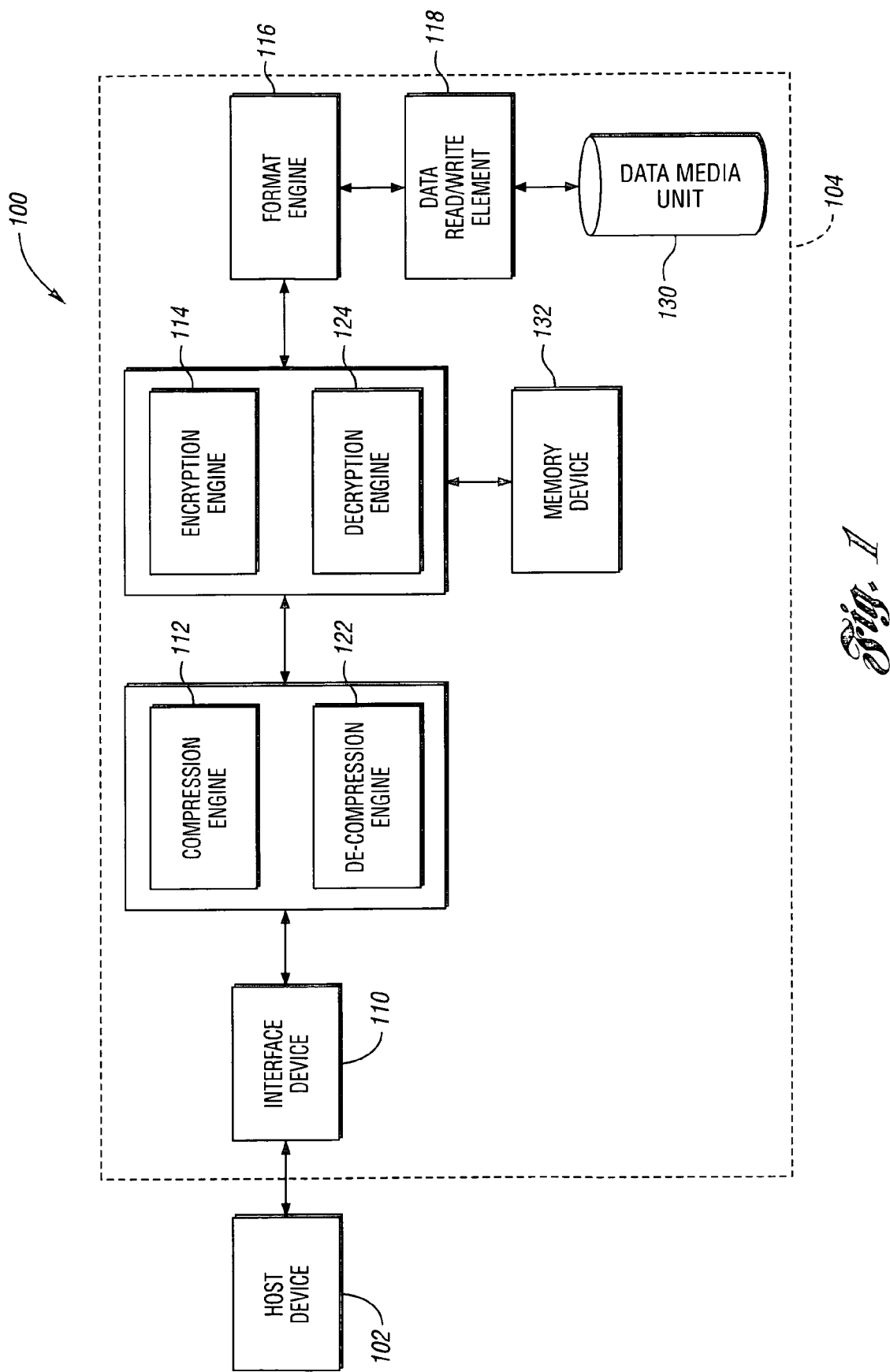
FIG. 1 is a schematic diagram of a system for encrypting data to provide at-rest data encryption of data in a data storage device according to at least one embodiment of the present invention.

Referring to FIG. 1, a schematic diagram is provided of a system 100 for encrypting data to provide at-rest data encryption of data, such as compressed data, in a data storage device according to at least one embodiment of the present invention. As illustrated, the system generally comprises a host device 102 in electronic communication with the data storage device 104 (e.g., magnetic tape drive, optical tape drive, magnetic disk drive, optical disk drive, holographic media drive, and/or the like). The data storage device 104 generally comprises an interface device 110, a compression engine 112, an encryption engine 114, a format engine 116, a data read/write element 118, a de-compression engine 122, a decryption engine 124, and/or a data media unit 130.

In general the host device 102 may be any suitable data generating and/or gathering device, such as a computer, that is electronically coupled to the data storage device 104 for transmitting and/or receiving data (i.e., host data stream) to/from, respectively, the data storage device 104.

Similarly, the interface device 110 may be any suitable device for managing communication (e.g., communication protocols, and the like) between the host device 102 and the data storage device 104. In particular, the interface device 110 may receive and/or transmit one or more signals (e.g., electronic, wireless, etc.) corresponding to data (i.e., host data stream) from/to, respectively, the host device 102. In at least one embodiment, the interface device 110 may electronically couple the host device 102 to a compression 112 and/or decompression engine 122 of the data storage device 104.

The compression engine 112 generally receives a host data stream packet (i.e., host data packet) of the host data stream from the interface device 110 and may generate (i.e., selectively generates) a compressed data packet. In general, the compression engine 112 may determine whether or not to generate the compressed data packet based on any appropriate criteria and/or trigger to meet the design criteria of a particular application. In at least one embodiment, the compression engine 112 may generate the compressed data packet using a lossless compression algorithm, such as an algorithm based on the Lempel-Ziv family of compression algorithms, such that redundant components of the host data packet are removed (i.e., eliminated). However, any appropriate compression algorithm may be implemented to satisfy the design criteria of a particular application.

In general, the compressed data packet comprises a compressed component corresponding to the host data stream packet and a first set of meta data indicative of one or more characteristics of the compressed data packet. The first set of meta data may be generated, for example, using a buffer management device (not shown). In at least one embodiment, the first set of meta data may include one or more meta data elements corresponding to the host logical unit length, the host data stream packet type, the host logical unit address, error correction data, and/or the compression algorithm used to generate the compressed data packet. However, any appropriate information may be implemented as a member (i.e., a meta data element) of the first set of meta data to meet the design criteria of a particular application.

The encryption engine 114 is generally in electronic communication with the compression engine 112 for receiving an unencrypted data packet from the compression engine 112. The unencrypted data packet generally comprises the compressed data packet when the compression engine 112 has generated the compressed data packet from the host data packet. In the alternative, the unencrypted data packet may comprise the host data packet when the compression engine has not generated the compressed data packet. The encryption engine 114 is generally configured to generate an encrypted data packet. The encrypted data packet may comprise an encrypted component corresponding to the unencrypted data packet and a second set of meta data indicative of one or more characteristics of the encrypted data packet. As with the first set of meta data, any appropriate information may be implemented as a member (i.e., a meta data element) of the second set of meta data to meet the design criteria of a particular application.

Implementation of the present invention with conventional data storage device technology may, in at least one embodiment, be facilitated by encrypting the unencrypted data packet, including any first set of meta data, in its entirety (i.e., as a unit) using an encryption algorithm such as the CCM mode of AES-256 encryption. In such an embodiment, however, it may be desirable to preserve one or more elements of the first set of meta data in plain-text format (i.e., an unencrypted format) for subsequent use by one or more components of the system 100. In one exemplary embodiment, preservation of the one or more elements may be implemented by copying the one or more elements to a buffer memory of a memory device 132 prior to encryption of the unencrypted data packet. The one or more elements of the first set of meta data may then be included as elements, either directly or in modified form, of the second set of meta data. Accordingly, one or more elements of the second set of meta data may correspond, at least in part, to one or more elements of the first set of meta data. In addition, the one or more elements of the second set of meta data corresponding to the one or more elements of the first set of meta data may be updated to reflect the encryption operation. For example, an element of the second set of meta data corresponding to host logical unit length may be a modified form of an element of the first set of meta data, the modification reflecting a change in length as a result of the encryption operation.

In at least one embodiment, the second set of meta data may comprise one or more additional meta data elements, as compared with the meta data elements of the first set of meta data. The one or more additional meta data elements may correspond to the encryption operation and may include one or more data elements corresponding to an encryption tag (if appropriate for the encryption algorithm and/or format used,) a cyclic redundancy check field, a key identifier, and/or an initialization vector which may take the form of a nonce.

In general, the encryption tag may be a value generated as part of the encryption algorithm. Because the encryption tag value generated as part of the encryption algorithm depends on the particular composition of the encrypted component as well as the encryption header data which includes the key identifier, nonce and other data required to control the encryption process, the encryption tag may be checked as part of the decryption process to determine whether the encrypted component or any part of the encryption header information has been modified, corrupted and/or tampered with.

The cyclic redundancy check generally provides an additional level of security and verifies that all parts of the encrypted data packet, including metadata are correct.

The key identifier generally corresponds to an encryption key. Accordingly, the key identifier may provide a mechanism for recording, with the encrypted data packet, an indicator of the key used to encrypt, and therefore the key required to decrypt, the encrypted data packet while preserving the secrecy of the encryption key. In particular, the key identifier may be arbitrarily assigned to a particular encryption key such that knowledge of the key identifier, by itself, provides no further indication of the content of the encryption key.

The nonce is a particular embodiment of the initialization vector used in the encryption process and may be defined as a unique value used during encryption of a block (e.g., string, packet, etc.) of data that ensures that unique cipher-text (i.e., encrypted data) is generated without regard to the data to be encrypted and the encryption key applied. An example of a suitable nonce which may be used in one or more embodiments of the present invention is described in the commonly assigned U.S. patent application Ser. No. 11/389,835, entitled "Nonce Structure for Storage Devices", filed Mar. 27, 2006, hereby incorporated by reference in its entirety.

In general, the one or more meta data elements corresponding to the encryption tag, the cyclic redundancy check value, the key identifier and/or the nonce may be recorded in a plain-text format for subsequent use by one or more components of the system 100.

The format engine 116 may electronically couple (i.e. link via electronic communication) the encryption engine 114 with a data read and/or write (i.e., data read/write) element 118. The format engine 116 generally receives the encrypted data packet from the encryption engine 114 and generates a formatted data packet satisfying a data read/write constraint of a target data media unit 130. In at least one embodiment, the format engine 116 may associate additional meta data elements with and/or modify existing meta data elements of the encrypted data packet.

The data read/write element 118 generally receives the formatted data packet and writes the formatted data packet to the data media unit 130. The data media unit 130 may be any appropriate type of data recording media to satisfy the design criteria of a particular application, such as a magnetic tape, a magnetic disk, an optical disk, an optical tape, a holographic tape, a holographic disk, a solid state memory, and/or the like.

Retrieval (i.e., reading) of previously encrypted data recorded on a data media unit 130 is generally performed by reversing the recording (i.e., data write) steps. Accordingly, a formatted data packet may be read from the data media unit 130 via a read element of the data read/write element 118. The format engine 116 generally receives the formatted data packet from the data read/write element 118 and reconstitutes (i.e., generates) a corresponding encrypted data packet from the formatted data packet.

The decryption engine 124 is generally in electronic communication with the format engine 116 for receiving the corresponding encrypted data packet. In at least one embodiment, the meta data element of the second set of meta data corresponding to the cyclic redundancy check data and/or the encryption tag may be identified and compared with one or more values generated by the decryption engine 124, via application of the cyclic redundancy check algorithm and/or the decryption algorithm, to determine if one or more components of the corresponding encrypted data packet has been modified and/or corrupted during data storage. In addition or in the alternative, the decryption engine 124 may reconstitute (i.e., generate) a corresponding unencrypted data packet from one or more components of the corresponding encrypted data packet. In at least one embodiment, reconstituting the corresponding unencrypted data packet may include identifying the nonce and the key identifier for the corresponding encrypted data packet, as previously recorded in one or more elements of the second set of meta data. In such an embodiment, the encryption key (i.e., media key) may be identified (e.g., extracted from the memory device 132 in electronic communication with the decryption engine 124) via the key identifier and the corresponding unencrypted data packet may be reconstituted (i.e., generated) by applying the encryption key and nonce value to the corresponding encrypted data packet. The decryption engine 124 may optionally remove all elements of the second set of meta data such that the corresponding unencrypted data packet is identical or substantially similar to the unencrypted data packet prior to processing by the encryption engine 114. As illustrated in FIG. 1, the decryption engine 124 may be integrated with the encryption engine 114. However, the decryption engine 124 may be implemented as an integrated or stand alone device to meet the design criteria of a particular application.

The de-compression engine 122 is generally in electronic communication with the decryption engine 124 for receiving the corresponding unencrypted data packet. In general, the de-compression engine 122 may reconstitute (i.e., generate) a corresponding host data stream packet from the corresponding unencrypted data packet. The de-compression engine 122 may optionally remove any elements of the first set of meta data such that the corresponding host data stream packet is identical or substantially similar to the host data stream packet prior to processing, if any, by the compression engine 112. As illustrated in FIG. 1, the de-compression engine 122 may be integrated with the compression engine 112. However, the de-compression engine 122 may be implemented as an integrated or stand alone device to meet the design criteria of a particular application.

Accordingly, the interface device 110 may receive the corresponding host data stream packet from the de-compression engine 122 and transmit the corresponding host data stream packet to the host device 102.

One or more components (e.g., 110, 112, 114, 116, 122, 124, etc.) of the system 100 as described herein are optionally implemented in a data storage device 104 as firmware, software, a Field Programmable Gate Array, an Application Specific Integrated Circuit, a discrete logic module and/or other appropriate device to meet the design criteria of a particular application. Furthermore, in at least one embodiment of the present invention, one or more components may be implemented external to the data storage device 104.

Figure 2:
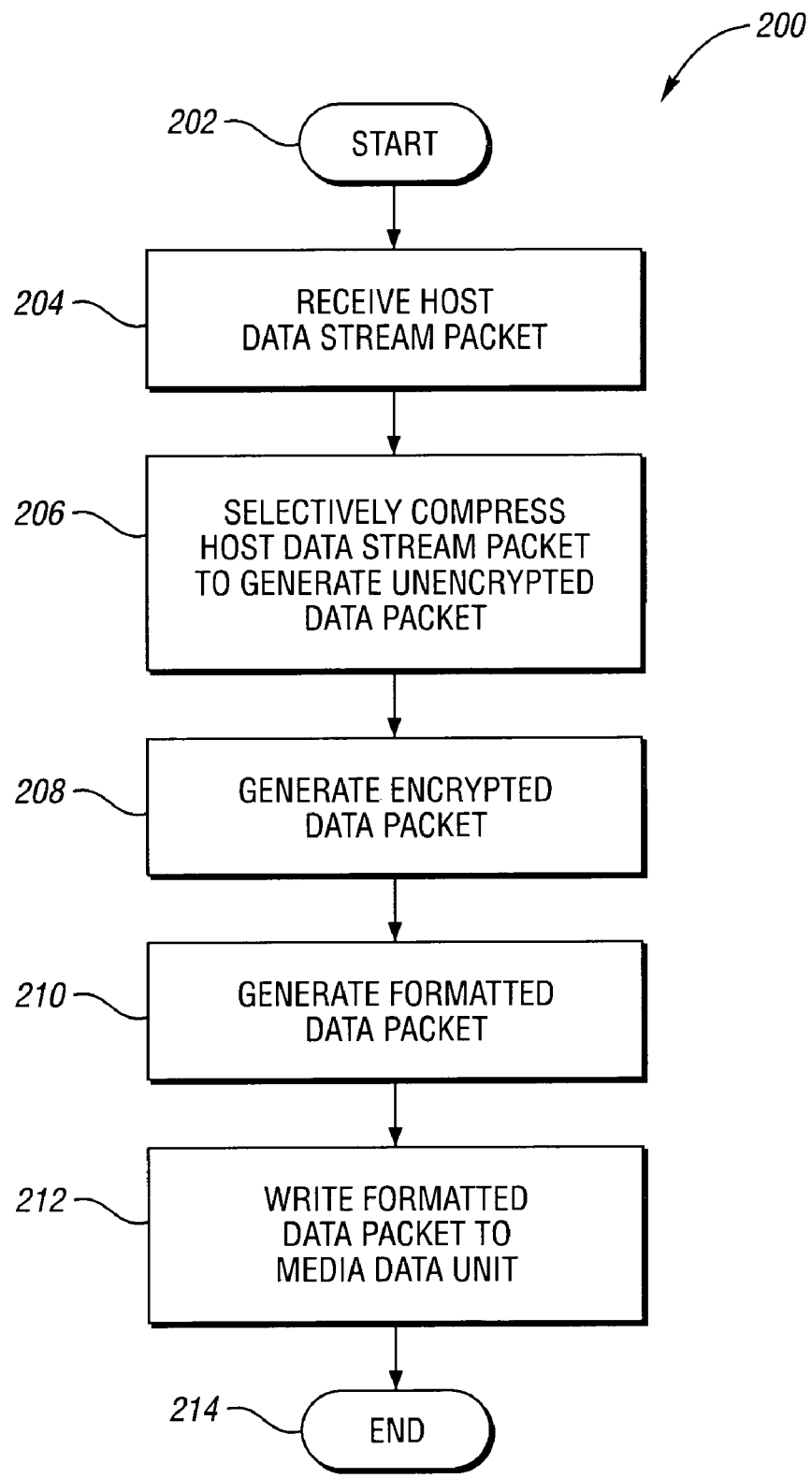
FIG. 2 is a flow diagram of a method for encrypting data to provide at-rest data encryption of data in a data storage device according to at least one embodiment of the present invention.

Referring to FIG. 2, a flow diagram of a method 200 for encrypting data to provide at-rest data encryption in a data storage device according to at least one embodiment of the present invention is shown. The method 200 may be advantageously implemented in connection with the system 100, described previously in connection with FIG. 1, and/or any appropriate system to meet the design criteria of a particular application. Furthermore, the method 200 may be performed by any appropriate logical device associated with one or more components (e.g., 110, 112, 114, 116, 118, 122, 124, 132, etc.) of the appropriate system (e.g., 100). The method 200 generally includes a plurality of blocks or steps that may be performed serially. As will be appreciated by one of ordinary skill in the art, the order of the blocks/steps shown in FIG. 2 is exemplary and the order of one or more block/step may be modified within the spirit and scope of the present invention. However, it should be understood that a compression step (e.g., 206), if any, should be performed prior to any encryption process (e.g., 208). If the order of these two steps is reversed, the encryption process will randomize the data, thus removing any redundancy and the compression process will be ineffective. Additionally, the blocks/steps of the method 200 may be performed in at least one non-serial (or non-sequential) order, and one or more blocks/steps may be omitted to meet the design criteria of a particular application. Similarly, two or more of the blocks/steps of the method 200 may be performed in parallel. Step 202 generally represents an entry point into the method 200.

At step 204, a host data stream packet (i.e., host data packet) is generally received at a compression engine (e.g., 112). In at least one embodiment, the host data stream packet is transmitted to the compression engine via an interface device (e.g., 110) operating to electronically couple the compression engine to a host device (e.g., 102). From step 204, the method 200 generally proceeds to step 206.

At step 206, an unencrypted data packet may be generated using the compression engine. In at least one embodiment, the unencrypted data packet includes a compressed component corresponding to the host data stream packet, and a first set of meta data. Such an unencrypted data packet may also be referred to as a compressed data packet. The first set of meta data is generally indicative of one or more characteristic (e.g., host logical unit length, host data stream packet type, host logical unit address, error correction data, applied compression algorithm, etc.) of the compressed data packet and may optionally be stored in a plain-text format. In at least one other embodiment, the host data stream packet may be passed uncompressed through the compression engine such that the unencrypted data packet comprises the host data stream packet in an uncompressed state. Accordingly, step 206 may represent selective compression of the host data stream packet. In general, any appropriate criteria and/or trigger may be used to determine whether or not to compress the host data stream packet.

As previously discussed, the compression engine may, in one or more embodiment, use a lossless compression algorithm, such as an algorithm based on the Lempel-Ziv family of compression algorithms, to remove redundant components of the host data stream packet. From step 206, the method 200 generally proceeds to step 208.

At step 208, an encrypted data packet may be generated by the encryption engine from the unencrypted data packet using an encryption algorithm such as the CCM mode of AES-256 encryption (e.g., 114). In at least one embodiment the encrypted data packet may comprise an encrypted component corresponding to the unencrypted data packet, and a second set of meta data. The second set of meta data is generally indicative of one or more characteristic (e.g., applied nonce, applied key identifier, encryption tag, cyclic redundancy check field, etc.) of the encrypted data packet. Furthermore, one or more meta data elements of the second set of meta data may be stored (i.e., recorded) in a plain-text format. From step 208, the method 200 generally proceeds to step 210.

At step 210, the encrypted data packet may be formatted using a format engine to generate a formatted data packet satisfying a data read/write constraint of a target data media unit (e.g., 130) coupled to the data storage device (104). From step 210, the method 200 generally proceeds to step 212.

At step 212, the formatted data packet may be written (i.e., recorded) to the target data media unit (e.g., 130) associated with the data storage device (e.g, 104) via a data read/write element (e.g., 118). From step 212, the method 200 generally proceeds to step 214.

Step 214 generally represents an exit point out of the method 200.

It should be understood that retrieval of previously encrypted data recorded on a data media unit for subsequent transmission to a host device may be performed by reversing the steps of the method 200 and substituting a decryption engine (e.g., 124) for the encryption engine and a de-compression engine (e.g., 122) for the compression engine.

In accordance with various embodiments of the present invention, the methods described herein may be implemented as firmware, software, a Field Programmable Gate Array, an Application Specific Integrated Circuit, one or more discrete logic module of a data storage device and/or other appropriate device to meet the design criteria of a particular application. It should also be noted that a software implementation of the present invention as described herein may be optionally stored on a tangible storage medium.

Furthermore, while reference has been made to a first and second set of meta data for clarity in the preceding description, it should be understood that the elements of the first and second meta data sets may be stored and/or written as a single group of meta data.

Figure 3:
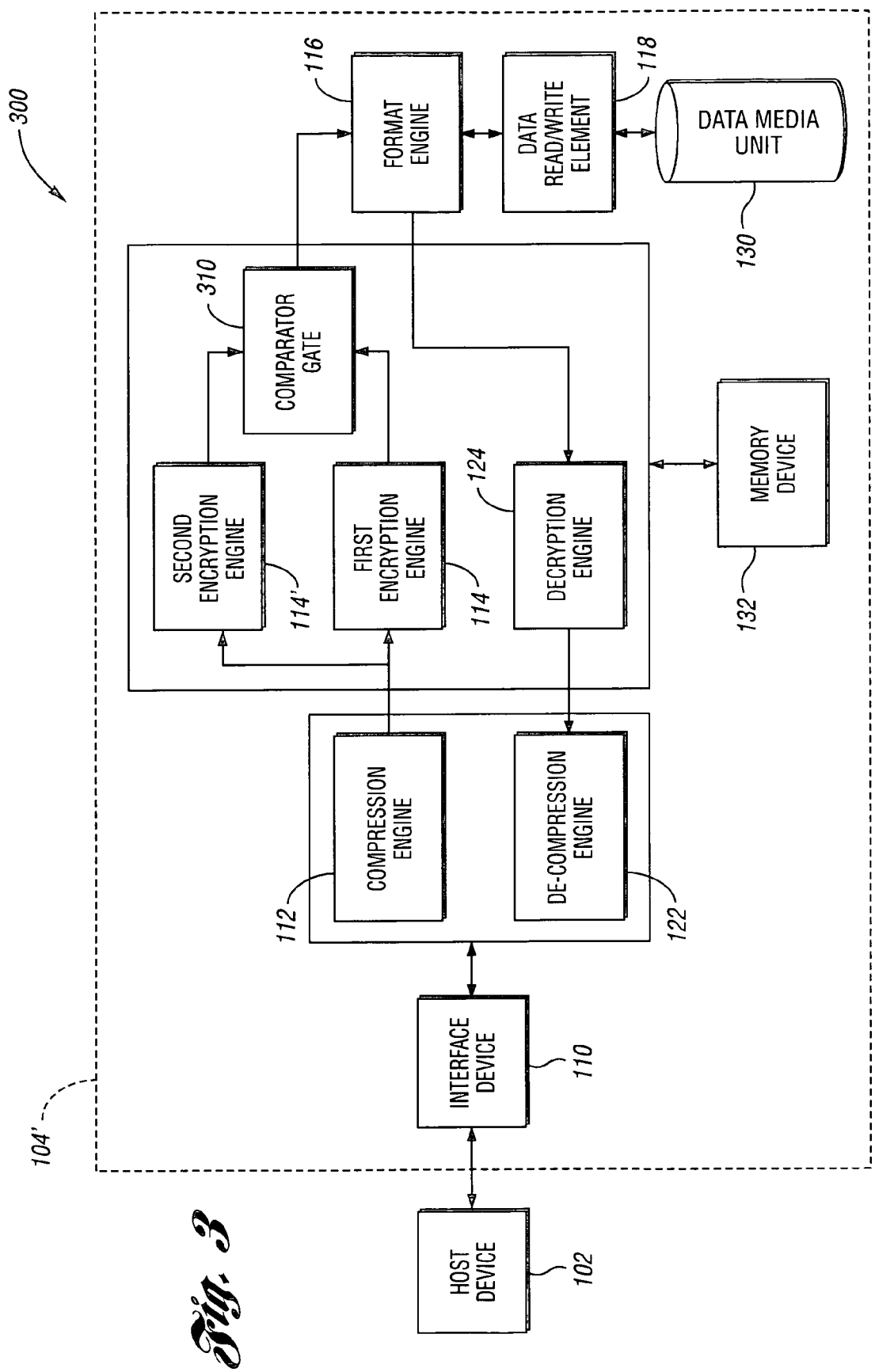
FIG. 3 is a schematic diagram of a system for encrypting data having encryption integrity verification according an embodiment of the present invention.

Referring to FIG. 3, a schematic diagram is provided of a system 300 for encrypting data having encryption integrity verification according an embodiment of the present invention. In general, the system 300 may be implemented similarly to the system 100. However, the data storage device 104' of the system 300 may further include a second encryption engine 114' and a comparator (i.e., comparator gate, comparator device, etc.) 310.

In at least one embodiment, the first encryption engine 114 may be configured to receive and store a set of encryption keys (i.e., media keys), for use in generating a first encrypted data packet, at a first physical memory location. Furthermore, the second encryption engine 114' may be configured to receive and store the same or substantially similar set of encryption keys, for use in generating a second encrypted data packet, at a second physical memory location. Accordingly, each of the encryption engines (i.e., the first encryption engine 114 and the second encryption engine 114') generally receives and independently store one or more encryption keys. In at least one embodiment, the one or more encryption keys may be stored in memory device 132. However, any appropriate device and any appropriate number of devices may be implemented to meet the design criteria of a particular application.

The second encryption engine 114' is generally implemented similarly to and in parallel with the first encryption engine 114 discussed previously in connection with FIG. 1. Accordingly, both the first 114 and second 114' encryption engines are generally configured to receive an unencrypted data packet and generate a first/second, respectively, encrypted data packet based at least in part on the unencrypted data packet. In at least one embodiment, the unencrypted data packet may be presented to the first 114 and second 114' encryption engines by a compression engine 112. However, the unencrypted data packet may be presented to the first 114 and second 114' encryption engines by any appropriate device to meet the design criteria of a particular application.

The comparator 310 may be any appropriate logical device for receiving the first and second encrypted data packets from the first 114 and second 114' encryption engines, respectively. In addition, the comparator 310 may be configured to determine (e.g. via a byte-by-byte comparison) whether the first and second encrypted data packets are identical. In general, the first or second encrypted data packet is transmitted (i.e., outputted), such as to a format engine 116 for subsequent recordation on a data media unit 130, when the first and second encrypted data packets are identical. In contrast, the first and second encrypted data packets may be discarded (i.e., not written to a data media unit 130) when the first and second encrypted data packets are not identical. Such an embodiment generally prevents erroneously encrypted data from being subsequently recorded (i.e., written) to the data media unit 130.

In at least one embodiment, the first 114 and second 114' encryption engines may be further configured to re-generate the first and second encrypted data packets, respectively, based at least in part on the unencrypted data packet when the first and second encrypted data packets are not identical. In such an embodiment, generation of the first and second encrypted data packets based at least in part on the unencrypted data packet is iteratively performed until the first and second encrypted data packets are identical or a termination condition is satisfied. That is, when a discrepancy is identified, the encryption process may be repeated for the unencrypted data packet using the first 114 and second 114' encryption engines until a valid encrypted data packet is identified or a termination condition is satisfied. In general, the termination condition may be satisfied upon the completion (i.e., occurrence) of a predetermined number of iterations, the passing (i.e., lapse) of a predetermined amount of time and/or the satisfaction of any other appropriate condition.

Figure 4:
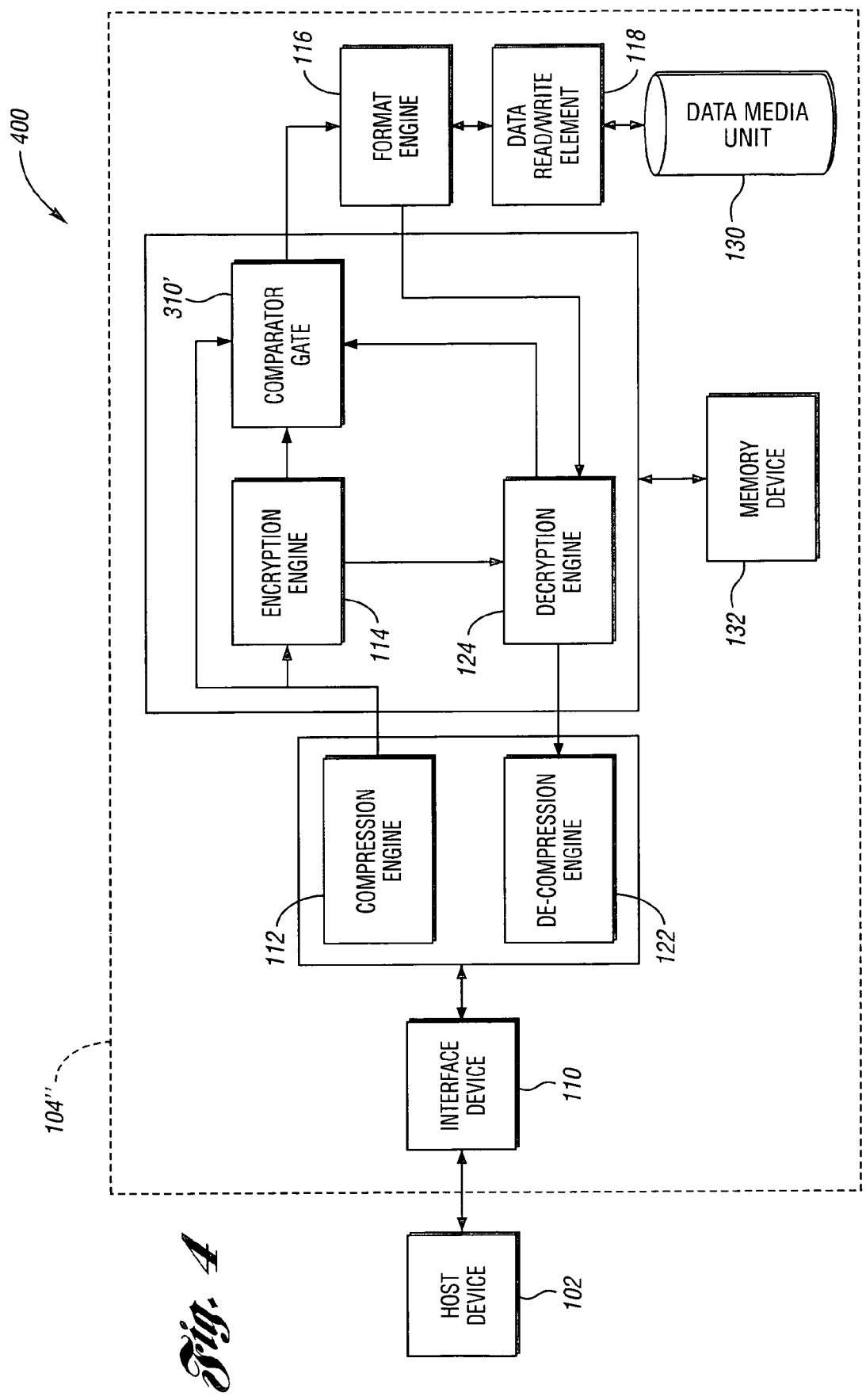
FIG. 4 is a schematic diagram of a system for encrypting data having encryption integrity verification according another embodiment of the present invention.

Referring to FIG. 4, a schematic diagram is provided of a system 400 for encrypting data having encryption integrity verification according an embodiment of the present invention. In general, the system 400 may be implemented similarly to the system 100. However, the data storage device 104" of the system 400 may also include a comparator (i.e., comparator gate, comparator device, etc.) 310'. Furthermore, the encryption engine 114 may be in electronic communication with the decryption engine 124.

Accordingly, the encryption engine 114 is generally configured to receive an unencrypted data packet and generate an encrypted data packet based at least in part on the unencrypted data packet. Furthermore, as illustrated in FIG. 4, the decryption engine 124 of the system 400 is generally in electronic communication with the encryption engine 114 for receiving the encrypted data packet from the encryption engine 114 and generating a decrypted data packet based at least in part on the encrypted data packet.

In at least one embodiment, the encryption engine 114 may be configured to receive and store a set of encryption keys (i.e., media keys), for use in generating the encrypted data packet, at a first physical memory location.

Furthermore, the decryption engine 124 may be configured to receive and store the same or substantially similar set of encryption keys, for use in generating the decrypted data packet, at a second physical memory location. Accordingly, each of the encryption engine 114 and the decryption engine 124 generally receive and independently store one or more encryption keys. In at least one embodiment, the one or more encryption keys may be stored in memory device 132. However, any appropriate device and any appropriate number of devices may be implemented to meet the design criteria of a particular application.

In general, the comparator 310' is in electronic communication with the encryption engine 114 and the decryption engine 124. In addition, in at least one embodiment, the comparator 310' may be configured to receive the unencrypted, decrypted, and/or encrypted data packets and to determine (e.g., via a byte-by-byte comparison) whether the unencrypted and decrypted data packets are identical. When comparator 310' determines that the unencrypted and decrypted data packets are identical, control logic generally presents the encrypted data packet as an output, such as to a format engine 116 for subsequent recordation on a data media unit 130, when the unencrypted and decrypted data packets are identical. As such, successful decryption of the encrypted data packet may validate the integrity of the process and allow the encrypted data to be passed to another device such as the formatter 116. In contrast, the encrypted data packet may be discarded (i.e., not written to a data media unit 130) when the unencrypted and decrypted data packets are not identical. Such an embodiment generally prevents erroneously encrypted data from being subsequently recorded (i.e., written) to the data media unit 130.

In at least one embodiment, the encryption 114 engine may be further configured to re-generate the encrypted data packet based at least in part on the unencrypted data packet when the unencrypted and decrypted data packets are not identical. In such an embodiment, generation of the encrypted data packet based at least in part on the unencrypted data packet is iteratively performed until the unencrypted and decrypted data packets are identical or a termination condition is satisfied. That is, when a discrepancy is identified, the encryption process may be repeated for the unencrypted data packet using the encryption engine 114 until a valid encrypted data packet is identified or a termination condition is satisfied. In general, the termination condition may be satisfied upon the completion (i.e., occurrence) of a predetermined number of iterations, the passing (i.e., lapse) of a predetermined amount of time and/or the satisfaction of any other appropriate condition.

Figure 5:
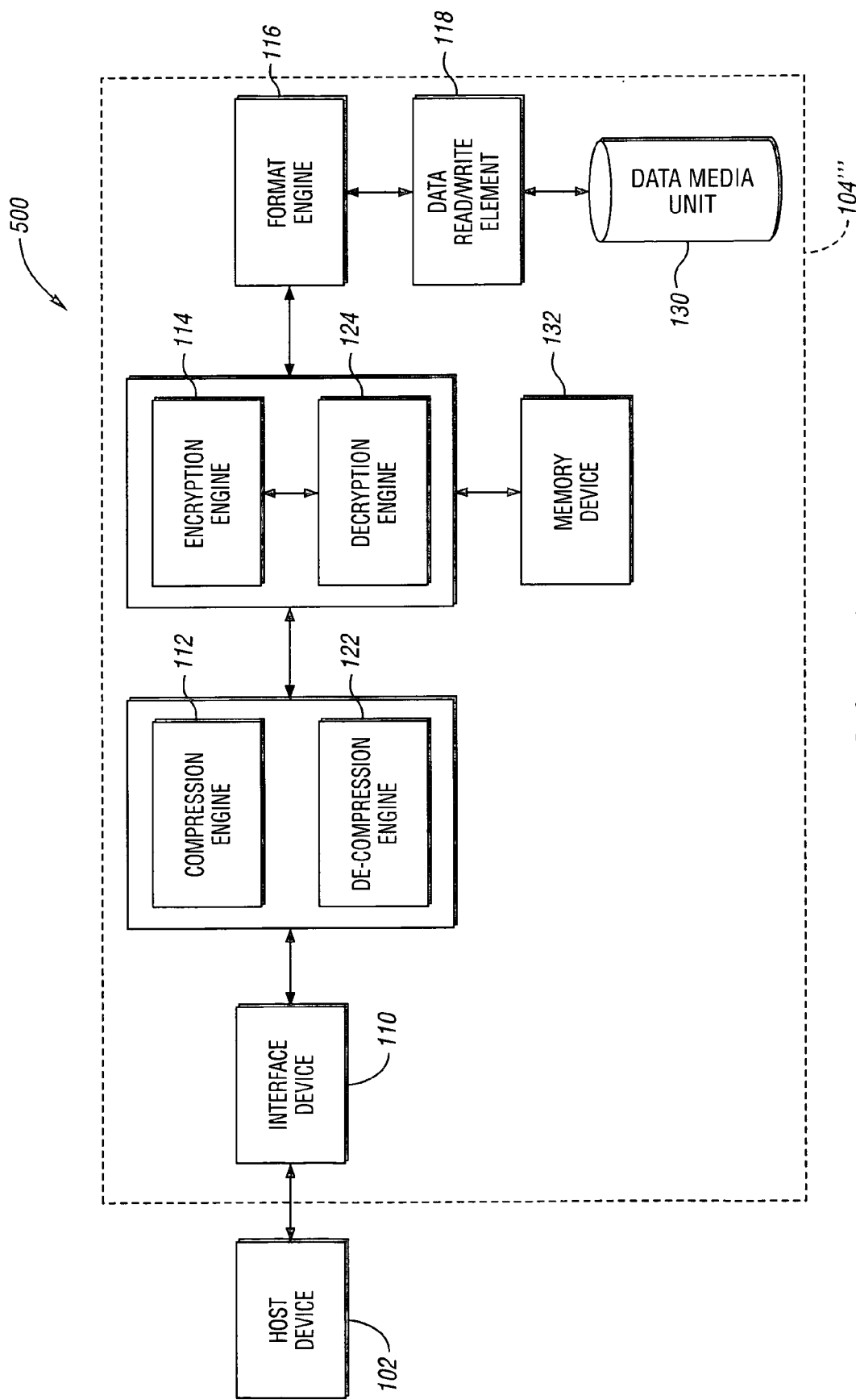
FIG. 5 is a schematic diagram of a system for encrypting data having encryption integrity verification according to yet another embodiment of the present invention.

Referring to FIG. 5, a schematic diagram is provided of a system 500 for encrypting data having encryption integrity verification according an embodiment of the present invention. In general, the system 500 may be implemented similarly to the system 100. However, the encryption engine 114 of the data storage device 104''' may be in electronic communication with the decryption engine 124.

In the system 500, the encryption engine 114 is generally configured to receive an unencrypted data packet and generate an encrypted data packet and a corresponding encryption tag (i.e., encryption tag) based at least in part on the unencrypted data packet. Furthermore, as illustrated in FIG. 5, the decryption engine 124 of the system 500 is generally in electronic communication with the encryption engine 114 for receiving the encrypted data packet and encryption tag, either as part of the encrypted data packet or as an associated data packet, from the encryption engine 114 and generating a decrypted data packet based at least in part on the encrypted data packet. In general, the encryption tag may be used during generation of the decrypted data packet to verify that the corresponding encryption process was successful. That is, successfully decrypting the encrypted data packet associated with the encryption tag verifies that the encrypted data packet was encrypted successfully. In general, the encrypted data packet may be presented as an output, such as to a format engine 116 for subsequent recordation on a data media unit 130, by at least one of the encryption engine 114 and decryption engine 124 when the encrypted data packet is successfully decrypted. In contrast, the encrypted data packet may be discarded (i.e., not written to a data media unit 130) when decryption of the encrypted data packet is not successful. Such an embodiment generally prevents erroneously encrypted data from being subsequently recorded (i.e., written) to the data media unit 130.

In at least one embodiment, the encryption engine 114 may be configured to receive and store a set of encryption keys (i.e., media keys), for use in generating the encrypted data packet, at a first physical memory location. Furthermore, the decryption engine 124 may be configured to receive and store the same or substantially similar set of encryption keys, for use in generating the decrypted data packet, at a second physical memory location. Accordingly, each of the encryption engine 114 and the decryption engine 124 generally receive and independently store one or more encryption keys. In at least one embodiment, the one or more encryption keys may be stored in memory device 132. However, any appropriate device and any appropriate number of devices may be implemented to meet the design criteria of a particular application.

In at least one embodiment, the encryption 114 engine may be further configured to re-generate the encrypted data packet and/or encryption tag, based at least in part on the unencrypted data packet, when decryption of the encrypted data packets is not successful. In such an embodiment, generation of the encrypted data packet and/or encryption tag is iteratively performed until decryption of the encrypted data packets is successful or a termination condition is satisfied. That is, when a discrepancy is identified, the encryption process may be repeated for the unencrypted data packet using the encryption engine 114 until a valid encrypted data packet is identified or a termination condition is satisfied. In general, the termination condition may be satisfied upon the completion (i.e., occurrence) of a predetermined number of iterations, the passing (i.e., lapse) of a predetermined amount of time and/or the satisfaction of any other appropriate condition.

Figure 6:
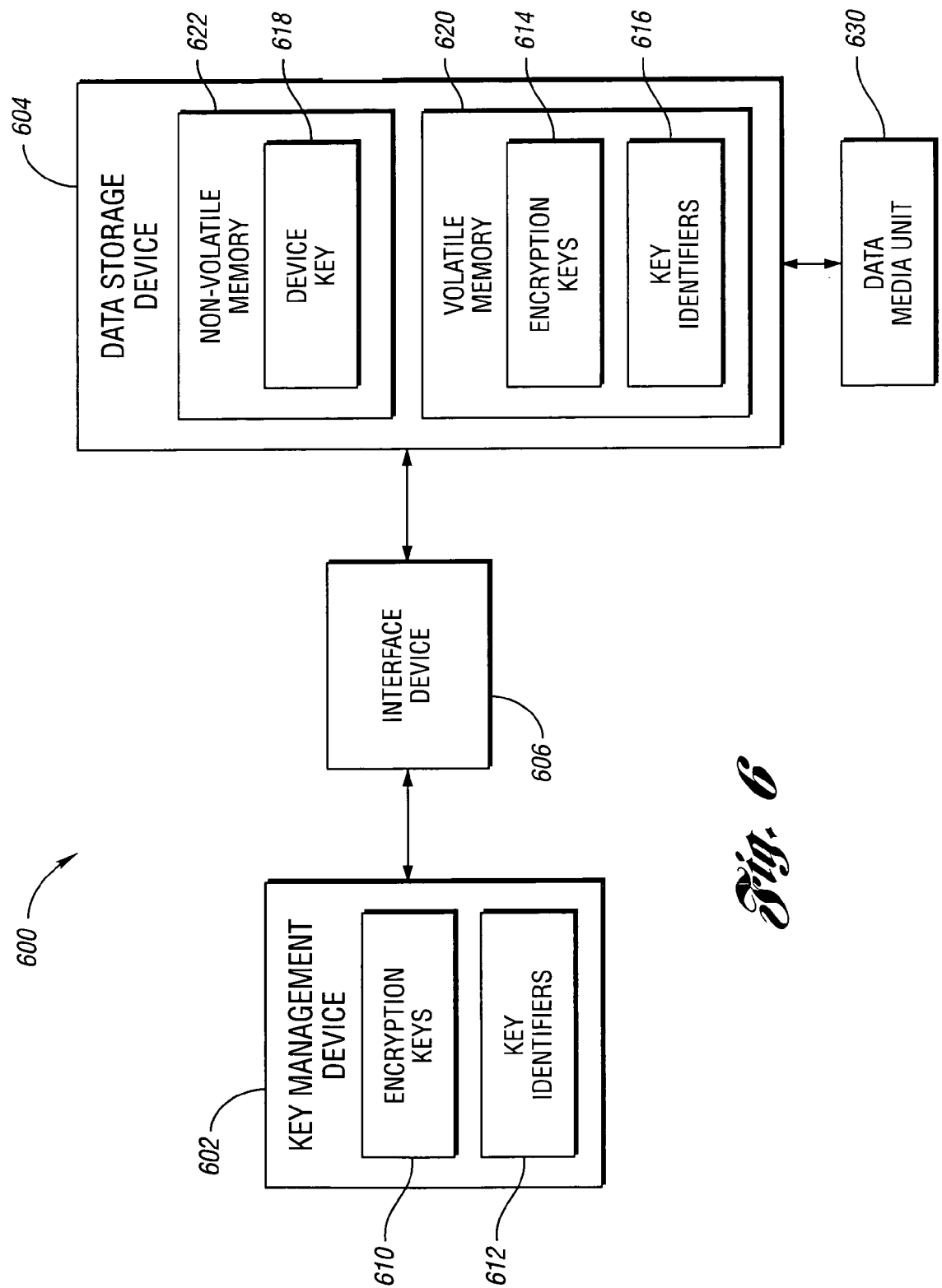
FIG. 6 is a schematic diagram of a data storage system according to an embodiment of the present invention.

Referring now to FIG. 6, a schematic diagram is provided of a data storage system 600 according to an embodiment of the present invention. In general, the system 600 may be implemented in connection with the system 100 described previously in connection with FIG. 1, the method 200 described previously in connection with FIG. 2, the system 300 described previously in connection with FIG. 3, the system 400 described previously in connection with FIG. 4, the system 500 described previously in connection with FIG. 5, and/or any appropriate system and/or method to meet the design criteria of a particular application.

The system 600 generally comprises a key management device 602, and a data storage device 604, such as the data storage device 104, 104', 104'', 104''' and/or any other appropriate data storage device. In at least one embodiment, the system 600 may also include an interface device 606.

The key management device 602 may be any appropriate device for storing (i.e., having, accessing, etc.) a set of encryption keys (i.e., media keys) 610 and/or a set of key identifiers 612. Each member of the set of key identifiers 612 generally corresponds to a member of the set of encryption keys 610 such that a particular encryption key may be identified via a corresponding key identifier.

In general, the data storage device 604 may be configured to store a subset of the set of encryption keys 614 and a corresponding subset of the set of key identifiers 616 in a volatile memory 620 of the data storage device 604. The use of the volatile memory 620 may be particularly beneficial when it is desired, for security reasons and/or the like, to erase the subset of the set of encryption keys 614 and the corresponding subset of the set of key identifiers 616 on power-down of the data storage device 604. However, the data storage device 604 may store the subset of the set of encryption keys 614 and the corresponding subset of the set of key identifiers 616 in any appropriate memory device and any appropriate number of memory devices to meet the design criteria of a particular application.

The data storage device 604 may be in electronic communication with the key management device 602 via the interface device 606. In general, the interface device 606 may act as an intermediary between the key management device 602 and the data storage device 604. That is, in at least one embodiment, the key management device 602 and the data storage device 604 may each communicate with the interface device 606 but may be prohibited (i.e., incapable) of communicating directly with each other. Such a topology may provide increased security.

In one embodiment, the interface device 606 may be configured to provide local storage of the subset of the set of encryption keys 614 and the corresponding subset of the set of key identifiers 616 for the data storage device 604. Furthermore, the interface device 606 and/or the key management device 602 via the interface device 606 may be configured to provide the subset of the set of encryption keys 614 and the corresponding subset of the set of key identifiers 616 to the data storage device 604 during power-up of the data storage device 604.

In general, the data storage device 604 may be configured to read and/or write an encrypted data packet from/to, respectively, a data media unit 630, such as the data media unit 130 and/or the like. In response to a data read operation, the data storage device 604 may (i.e., may be configured to) identify a key identifier corresponding to the encrypted data packet, and determine whether an encryption key corresponding to the key identifier is in the memory 620 of the data storage device 604. The data storage device 604 may generate, using the encryption key corresponding to the key identifier, an unencrypted data packet based at least in part on the encrypt data packet when the encryption key corresponding to the key identifier is in the memory 620 of the data storage device 604. In contrast, the data storage device 604 may request (e.g., via the interface device 606) the encryption key corresponding to the key identifier from the key management device 602 when the encryption key corresponding to the key identifier is not in the memory 620 of the data storage device 604. The request may include any appropriate data, such as the key identifier, to meet the design criteria of a particular application.

In response to a request for an encryption key, the key management system 602 may determine (e.g., via any appropriate mechanism such as operator intervention, a predetermined policy and/or the like) whether the request is valid (i.e., whether the request should be granted). When the request is valid, the key management system 602 may identify an encryption key corresponding to the request from the set of encryption keys 610 and transmit (e.g., via the interface device 606) the corresponding encryption key to the data storage device 604. Alternatively, the key management device 602 may perform any appropriate action and/or inaction in response to an invalid request.

In at least one embodiment, the interface device 606 may be a portable electronic device such as a token device (i.e., token). In such an embodiment, the portable interface device 606 may be securely hand-carried and/or otherwise physically transported between the data storage device 604 and the key management device 602. In at least one other embodiment, the interface device 606 may electrically couple to the data storage device 604 and the key management device 602 via a first and second network, respectively. Such an embodiment may provide increased efficiencies in the management and/or distribution of members of the set of encryption keys 610 and/or members of the set of key identifiers 612.

However, any appropriate device and/or mechanism may be implemented to transport data between the key management device 602 and the data storage device 604 to meet the design criteria of a particular application.

In one or more embodiment, the system 600 may further comprise a device key 618 for use in encrypting data transmitted (e.g., via the interface device 606) between the data storage device 604 and the key management device 602. In a particular embodiment, the device key 618 may be stored in a non-volatile memory 622 of the data storage device 604 such that the device key 618 is not lost (i.e., remains known to the data storage device 604) after a power-down of the data storage device 604. However, any appropriate memory device and any appropriate number of memory devices may be implemented to meet the design criteria of a particular application.

In general, the device key 618 corresponds to and may be unique to the data storage device 604 to which it is assigned. In at least one embodiment, the key management device 602 may include a set of device keys (not shown) for decrypting data encrypted using the device key 618, for managing the distribution of one or more device keys 618 to one or more data storage devices 604, and/or the like.

In one or more embodiment, the data storage device 604 may be further configured to perform a cyclic redundancy check on the subset of the set of encryption keys 614 and/or the corresponding subset of the set of key identifiers 616. In such an embodiment, the data storage device 604 may request (i.e., re-validate) the subset of the set of encryption keys 614 and the corresponding subset of the set of key identifiers 616 from the key management device 602 (e.g., via the interface device 606) when a cyclic redundancy data check fails.

As described above, then, one or more embodiments of the present invention may, inter alia, provide encryption integrity verification and/or encryption key management. Furthermore, one or more embodiments of the present invention may provide at-rest data encryption. When implemented in connection with a data compression technique, one or more embodiments of the present invention may provide at-rest data encryption of compressed data in a data storage device.

Accordingly, one or more embodiments of the present invention may increase data security during shipment/relocation of data media units, and/or reduce the need to securely erase data media units prior to disposal and/or re-use. Similarly, one or more embodiments may provide increased efficiencies during data destruction as destruction of the corresponding encryption key may be equated to destruction of the data itself.

It is further contemplated that one or more embodiments of the present invention may increase data security during natural disasters and/or other occurrences necessitating the evacuation of a data storage center. During such an occurrence, one or more encryption keys may be removed from the system such that the data remains securely undecipherable until the occurrence has passed and the encryption key is re-installed into the system.

While embodiments of the invention have been illustrated and described, it is not intended that these embodiments illustrate and describe all possible forms of the invention.

Rather, the words used in the specification are words of description rather than limitation, and it is understood that various changes may be made without departing from the spirit and scope of the invention.

What is claimed is:

1. A data encryption system with encryption integrity verification, the system comprising:
    an encryption engine configured to receive an unencrypted data packet and generate an encrypted data packet based at least in part on the unencrypted data packet;
    a decryption engine in electronic communication with the encryption engine, the decryption engine configured to receive the encrypted data packet and generate a decrypted data packet based at least in part on the encrypted data packet; and
    a comparator in electronic communication with the encryption engine and the decryption engine, the comparator configured to receive the unencrypted and decrypted data packets, determine whether the unencrypted and decrypted data packets are identical, and present the encrypted data packet as an output when the unencrypted and decrypted data packets are identical.

2. The system of claim 1 wherein:
    the encryption engine is further configured to receive and store a set of encryption keys, for use in generating the encrypted data packet, at a first physical memory location; and
    the decryption engine is further configured to receive and store the set of encryption keys, for use in generating the decrypted data packet, at a second physical memory location.

3. The system of claim 1 wherein the encrypted data packet is outputted to a format engine for subsequent recordation on a data media unit when the unencrypted and decrypted data packets are identical.

4. The system of claim 1 wherein the encrypted data packet is discarded when the unencrypted and decrypted data packets are not identical.

5. The system of claim 4 wherein the encryption engine is further configured to re-generate the encrypted data packet based at least in part on the unencrypted data packet when the unencrypted and decrypted data packets are not identical such that generation of the encrypted data packet based at least in part on the unencrypted data packet is iteratively performed until the unencrypted and decrypted data packets are identical or a termination condition is satisfied.

6. A data storage system comprising:
    a key management device having a set of encryption keys and a set of key identifiers, each member of the set of key identifiers corresponding to a member of the set of encryption keys; and
    a data storage device in communication with the key management device via an interface device, the data storage device configured to store a subset of the set of encryption keys and a corresponding subset of the set of key identifiers in a volatile memory of the data storage device, wherein the data storage device is configured to
    read an encrypted data packet from a data media unit;
    identify a key identifier corresponding to the encrypted data packet;
    determine whether an encryption key corresponding to the key identifier is in a memory of the data storage device;
    generate, using the encryption key corresponding to the key identifier, an unencrypted data packet based at least in part on the encrypted data packet when the encryption key corresponding to the key identifier is in the memory of the data storage device; and
    request, via the interface device, the encryption key corresponding to the key identifier from the key management device when the encryption key corresponding to the key identifier is not in the memory of the data storage device.

7. The system of claim 6 wherein the interface device electronically couples to the data storage device via a first network and the interface device electronically couples to the key management device via a second network.

8. The system of claim 6 further comprising a device key for use in encrypting data transmitted, via the interface device, between the data storage device and the key management device, the device key stored in a non-volatile memory of the data storage device, the device key corresponding to and unique to the data storage device.

9. The system of claim 6 wherein the data storage device is further configured to request the subset of the set of encryption keys and the corresponding subset of the set of key identifiers from the key management device, via the interface device, when a cyclic redundancy data check fails.

10. The system of claim 6 wherein the interface device comprises a portable electronic device.

* * * * *